United States Patent
Omelchenko et al.

(10) Patent No.: US 10,173,607 B1
(45) Date of Patent: Jan. 8, 2019

(54) AUTOMOTIVE PHONE HOLDER WITH INTEGRATED AIR FRESHENER

(71) Applicants: Nataliia Omelchenko, Brooklyn, NY (US); Anatoliy Omelchenko, Brooklyn, NY (US)

(72) Inventors: Nataliia Omelchenko, Brooklyn, NY (US); Anatoliy Omelchenko, Brooklyn, NY (US)

( * ) Notice: Subject to any disclaimer, the term of this patent is extended or adjusted under 35 U.S.C. 154(b) by 0 days.

(21) Appl. No.: 15/937,926

(22) Filed: Mar. 28, 2018

Related U.S. Application Data

(60) Provisional application No. 62/617,247, filed on Jan. 14, 2018.

(51) Int. Cl.
| | | |
|---|---|---|
| *B60R 13/02* | (2006.01) | |
| *B60R 7/00* | (2006.01) | |
| *B60R 11/02* | (2006.01) | |
| *B60H 3/00* | (2006.01) | |
| *B60R 11/00* | (2006.01) | |

(52) U.S. Cl.
CPC ........ *B60R 11/0241* (2013.01); *B60H 3/0028* (2013.01); *B60R 2011/0008* (2013.01); *B60R 2011/0059* (2013.01); *B60R 2011/0071* (2013.01); *B60R 2011/0089* (2013.01)

(58) Field of Classification Search
CPC .. B60R 7/00; B60R 7/06; B60R 11/02; F16M 13/02; F16M 13/022; F16M 11/08
USPC .......................... 224/570, 567, 555, 544, 483
See application file for complete search history.

(56) References Cited

U.S. PATENT DOCUMENTS

| | | | | |
|---|---|---|---|---|
| 4,200,229 A | * | 4/1980 | Spector | A61L 9/12 224/483 |
| 4,852,843 A | * | 8/1989 | Chandler | B60N 3/103 248/311.2 |
| 4,968,456 A | * | 11/1990 | Muderlak | A61L 9/122 137/60 |
| 5,092,395 A | * | 3/1992 | Amidzich | B60N 3/18 165/41 |
| 5,165,646 A | * | 11/1992 | Gewecke | B60N 3/103 165/80.1 |
| 5,394,506 A | * | 2/1995 | Stein | A61L 9/03 219/202 |
| 5,396,556 A | * | 3/1995 | Chen | B60R 11/0241 379/426 |
| 5,478,505 A | * | 12/1995 | McElfresh | A61L 9/122 239/57 |
| 5,489,055 A | * | 2/1996 | Levy | B60N 3/103 224/544 |
| 5,540,409 A | * | 7/1996 | Cunningham | B60N 3/103 224/926 |
| 5,593,124 A | * | 1/1997 | Wang | B60R 11/00 224/483 |
| 5,820,792 A | * | 10/1998 | Lin | A61L 9/122 261/30 |

(Continued)

*Primary Examiner* — Brian D Nash
(74) *Attorney, Agent, or Firm* — Larson & Larson, P.A.; Justin P. Miller; Frank Liebenow

(57) ABSTRACT

The automotive phone holder with integrated air freshener combines a phone holder that mounts to the louvers within an automobile air vent with an air freshener with replaceable fragrance strips.
The resulting automotive phone holder with integrated air freshener has three main parts: the head, the adjustment mechanism, and the mounting mechanism.

8 Claims, 6 Drawing Sheets

(56) References Cited

U.S. PATENT DOCUMENTS

| | | | | |
|---|---|---|---|---|
| 5,961,083 A * | 10/1999 | Hartmann | ............... | B60N 3/101 248/222.14 |
| 5,979,724 A * | 11/1999 | Loewenthal, Jr. | ............... | B60R 11/0241 224/483 |
| 6,441,872 B1 * | 8/2002 | Ho | ............... | B60R 11/0235 224/483 |
| 6,976,637 B2 * | 12/2005 | Massimo | ............... | A61L 9/12 239/145 |
| 7,712,718 B2 * | 5/2010 | Schimmeyer | ............... | B60N 3/107 220/482 |
| 7,766,294 B2 * | 8/2010 | Schimmeyer | ............... | B60N 3/103 220/482 |
| 7,857,178 B2 * | 12/2010 | Brown, Jr. | ............... | B60R 11/0247 224/483 |
| 8,322,584 B2 * | 12/2012 | Dethmers | ............... | B60H 1/00592 224/268 |
| 8,505,795 B2 * | 8/2013 | Dunn | ............... | B60R 11/00 224/545 |
| 8,573,455 B1 * | 11/2013 | Brown | ............... | B60R 11/0247 224/483 |
| 8,727,192 B2 * | 5/2014 | Lai | ............... | B60R 11/0241 224/282 |
| 8,757,461 B2 * | 6/2014 | Zanetti | ............... | B60R 11/02 224/562 |
| 9,004,331 B2 * | 4/2015 | Fan | ............... | B60R 11/02 224/483 |
| 9,080,714 B2 * | 7/2015 | Minn | ............... | B60R 11/0241 |
| D775,115 S * | 12/2016 | Ormsbee | ............... | D14/253 |
| 9,701,256 B2 * | 7/2017 | Haymond | ............... | B60R 11/02 |
| 9,744,913 B2 * | 8/2017 | Ormsbee | ............... | B60R 11/0241 |
| 9,868,532 B2 * | 1/2018 | Balmer | ............... | F16M 13/022 |
| 9,889,800 B1 * | 2/2018 | Fan | ............... | B60R 11/0241 |
| 9,975,497 B2 * | 5/2018 | Kim | ............... | B60R 11/0241 |
| 2014/0103087 A1 * | 4/2014 | Fan | ............... | B60R 11/02 224/544 |
| 2014/0138418 A1 * | 5/2014 | Dunn | ............... | B60R 11/02 224/483 |
| 2014/0138419 A1 * | 5/2014 | Minn | ............... | B60R 11/0241 224/567 |
| 2014/0183238 A1 * | 7/2014 | Lin | ............... | B60R 11/02 224/483 |
| 2017/0136960 A1 * | 5/2017 | Kim | ............... | B60R 11/0241 |

* cited by examiner

AUTOMOTIVE PHONE HOLDER WITH INTEGRATED AIR FRESHENER

CROSS-REFERENCE TO RELATED APPLICATION

This application is a claims priority to U.S. provisional application No. 62/617,247 filed Jan. 14, 2018.

FIELD

This invention relates to the field of mobile device holders, specifically an automobile device holder with integrated air freshener.

BACKGROUND

Mobile phones are an ever-present part of our lives. With the expansion of functions to include navigation and video conferencing, it has become more important to hold a phone within a specific part of a vehicle. Ideal locations are visible to the driver, while being within reach.

Such ideal locations are slightly different in each vehicle, but share a common element—the location of an air vent. By virtue of their function, vehicle air vents are distributed across the inside of a vehicle and exist within every modern car.

As part of the increasing time spent in vehicles, and the inclusion of pets and children in our lives, vehicles can begin to accumulate odors. Thus, in addition to every vehicle needing phone holder, an air freshener is a welcome addition.

In order to save space, it would be ideal if a phone holder could be combined with the mechanism for freshening the air in a vehicle.

What is needed is a device that combines a phone holder with an in-vehicle air freshener.

SUMMARY

The automotive phone holder with integrated air freshener combines a phone holder that mounts to the louvers within an automobile air vent with an air freshener with replaceable fragrance strips.

The resulting automotive phone holder with integrated air freshener has three main parts: the head, the adjustment mechanism, and the mounting mechanism.

The head is primarily from a clamp that grips the two sides of a cell phone. The clamp preferably includes a telescoping shape, or an adjustable width, thus allowing for use with different types of cell phones. The motivating force for the clamping action is provided by an internal spring.

The left arm and right arm of the clamp preferably include a rubber coating to increase the friction between the phone and the phone holder.

The opposite end of the automotive phone holder with integrated air freshener is the mounting mechanism, or the section that interfaces with the louvers of the automobile vent.

The mounting mechanism is preferably formed from a flange, or disc, that bridges the louver interface arms and the stem. The stem includes a ball, which is part of the adjustment mechanism.

The louver interface arms slide over the louvers of the air vent, locking the mounting mechanism in place.

The preferred embodiment includes four louver interface arms. With four arms, there are two pairs of gaps that interface with the louvers. The first pair of gaps is of a standard size. The standard gap will fit most automobile louvers. The second pair of gaps, offset by ninety degrees, are of an expanded size. This large gap will fit automobile louvers that are a greater than average thickness.

Within the louver interface arms are snap-in fragrance strips. The air freshener slots are outwardly-tapered, thus being narrower on the outside than on the inside. The air freshener strips are correspondingly tapered, and thus snap into the slots. The snapping shape relationship allows the air freshener strips to be held in place without glue or fasteners, and therefore replaceable by the user.

With the preferred embodiment including four louver interface arms, there are correspondingly four locations for fragrance strips. Many potential fragrances that can be used singly or in combination, such as: ocean breeze; lavender; lemon; *verbena*; pine; peppermint; and other scents.

Certain combinations combine well, such as lemon and lavender

While the preferred embodiment includes four louver interface arms, alternative embodiments include only two arms. Or, other multiples of arms may be used, such as six or eight.

The head and the mounting mechanism are preferably connected using an adjustable mechanism. In the preferred embodiment this is a ball and socket connection.

The ball and socket connection is formed using one or more gripping arms that partially surround a ball. The gripping arms preferably included threads, onto which a compression nut is placed. Rotation of the compression nut increases or decrease the force by the gripping arms on the ball, thereby prohibiting or allowing motion of the head with respect to the mounting mechanism.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
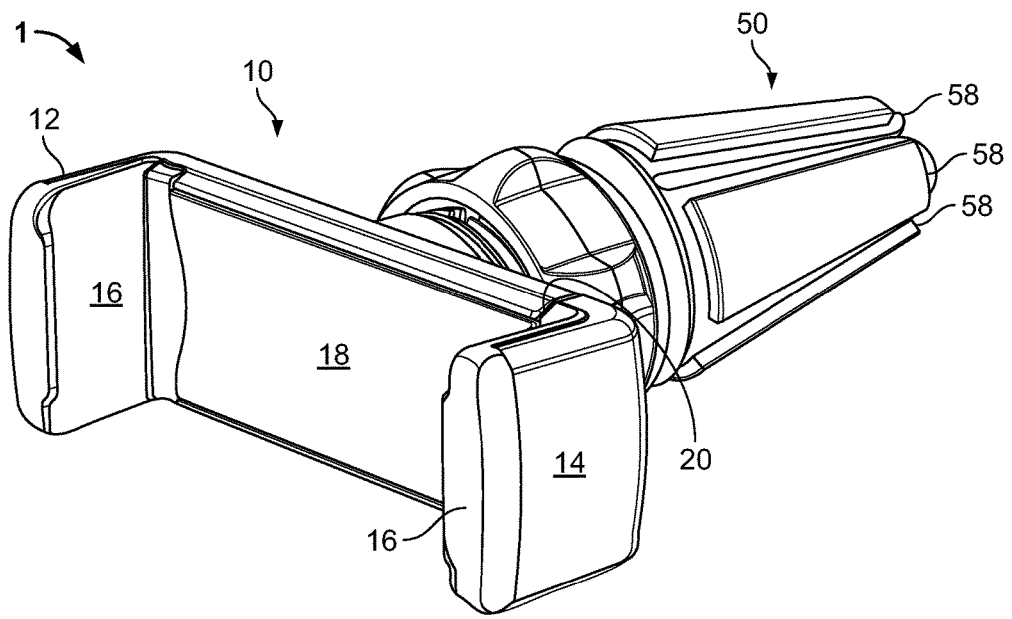
FIG. 1 illustrates an isometric view of a first embodiment.

Reference will now be made in detail to the presently preferred embodiments of the invention, examples of which are illustrated in the accompanying drawings. Throughout the following detailed description, the same reference numerals refer to the same elements in all figures.

Referring to FIG. 1, an isometric view of a first embodiment is shown.

The automotive phone holder with integrated air freshener 1 is shown with head 10. Head 10 is primarily comprised of clamp body 18, against which a mobile phone will rest.

Projecting from the clamp body 18 are left arm 12 and right arm 14, with each arm 12/14 including an optional rubber face 16.

The clamp body 18 is of adjustable width by means of the sliding connection 20.

At the rear of the automotive phone holder with integrated air freshener 1 is the mounting mechanism 50, which includes two or more louver interface arms 58.

Figure 2:
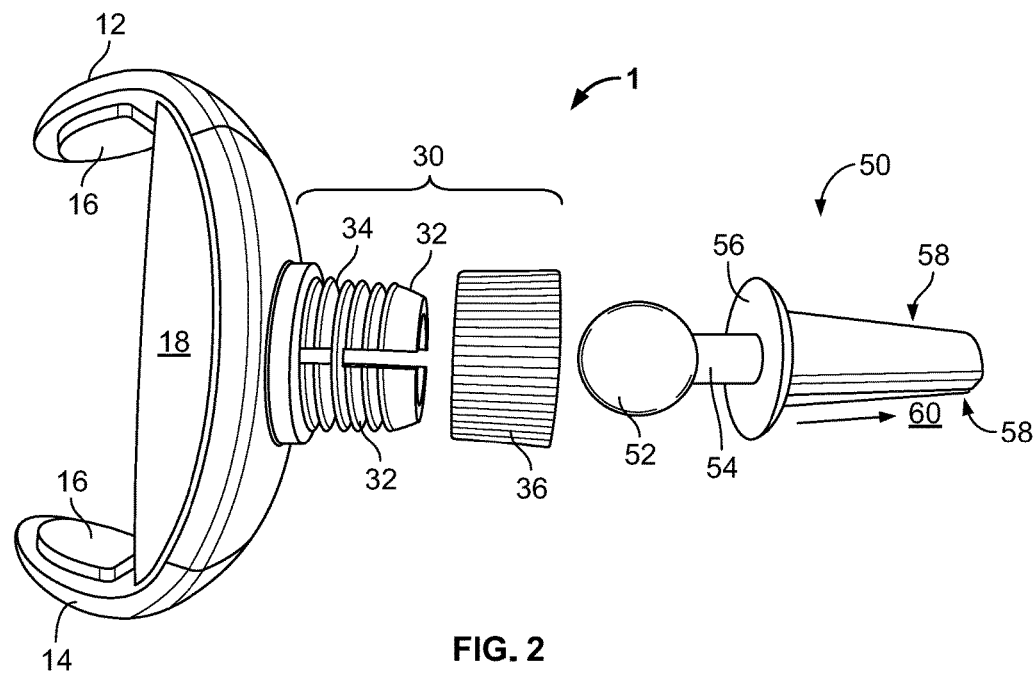
FIG. 2 illustrates an exploded view of a second embodiment.

Referring to FIG. 2, an exploded view of a second embodiment is shown.

The clamp body 18 is again shown with left arm 12 and right arm 14, each including an optional rubber face 16.

The adjustment mechanism 30 is shown with two gripping arms 32, each including threads 34 that interface with the compression nut 36.

The mounting mechanism 50 is shown with ball 52, which when in use is placed between the gripping arms 32. Ball 52 is connected by stem 54 to flange 56. Two or more louver interface arms 58 extend outward from flange 56, preferably forming a tapering profile 60.

Figure 3:
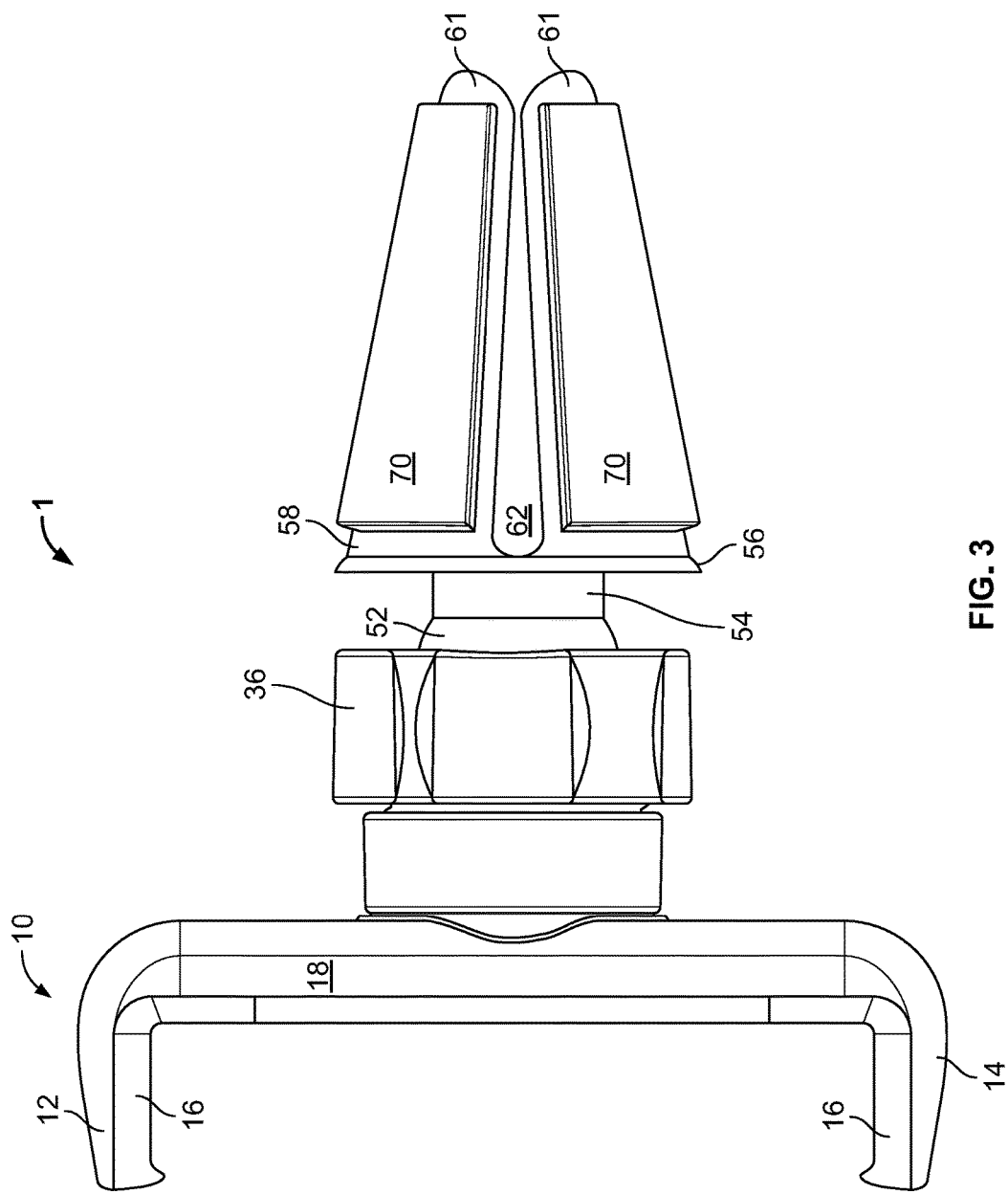
FIG. 3 illustrates a top view of the first embodiment.

Referring to FIG. 3, a top view of the first embodiment is shown.

Ball 52 is shown held by compression nut 36. Each louver interface arm 58 includes an air freshener strip 70. In order to ease installation of the louver interface arms 58, optional rounded arm tips 61 are included.

Between any two louver interface arms 58 is a louver gap 62. This is the space into which vent louvers 94 (See FIG. 6) are placed during installation.

Figure 4:
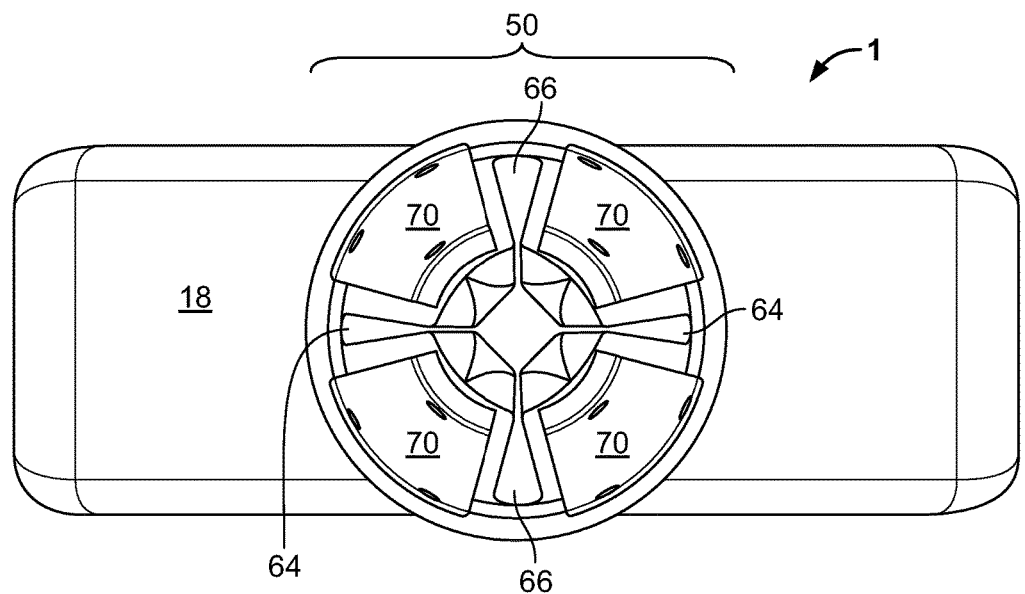
FIG. 4 illustrates a rear view of the first embodiment.

Referring to FIG. 4, a rear view of the first embodiment is shown.

The mounting mechanism 50 optionally includes two sizes of louver gap 62 (FIG. 3): a standard gap 64, for use in most vehicles, and an expanded gap 66, for use in vehicles with thicker than average louvers.

Figure 5:
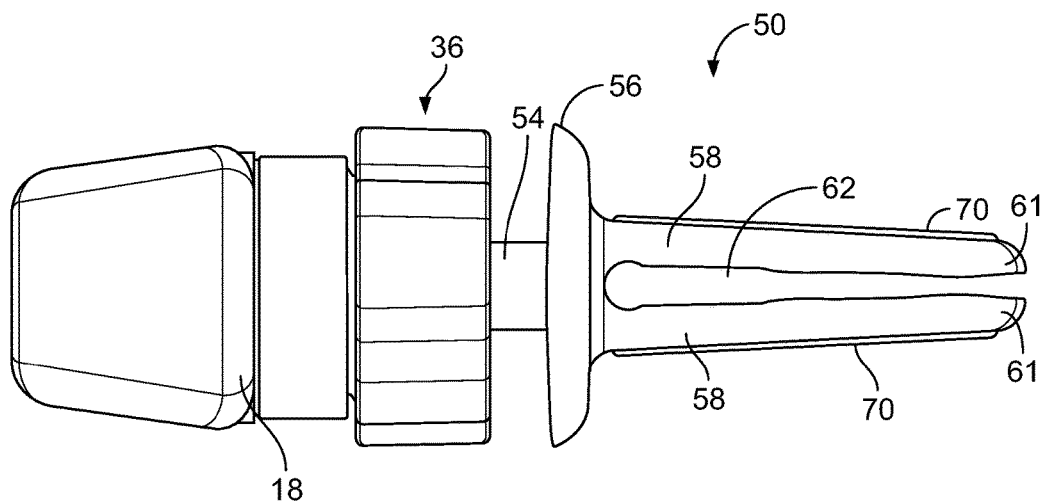
FIG. 5 illustrates a side view of a third embodiment.

Referring to FIG. 5, a side view of a third embodiment is shown.

The mounting mechanism 50 is shown with only two louver interface arms 58, with a louver gap 62 between the two arms 58. The air freshener strips 70 are substantially inside into the louver interface arms 58.

Figure 6:
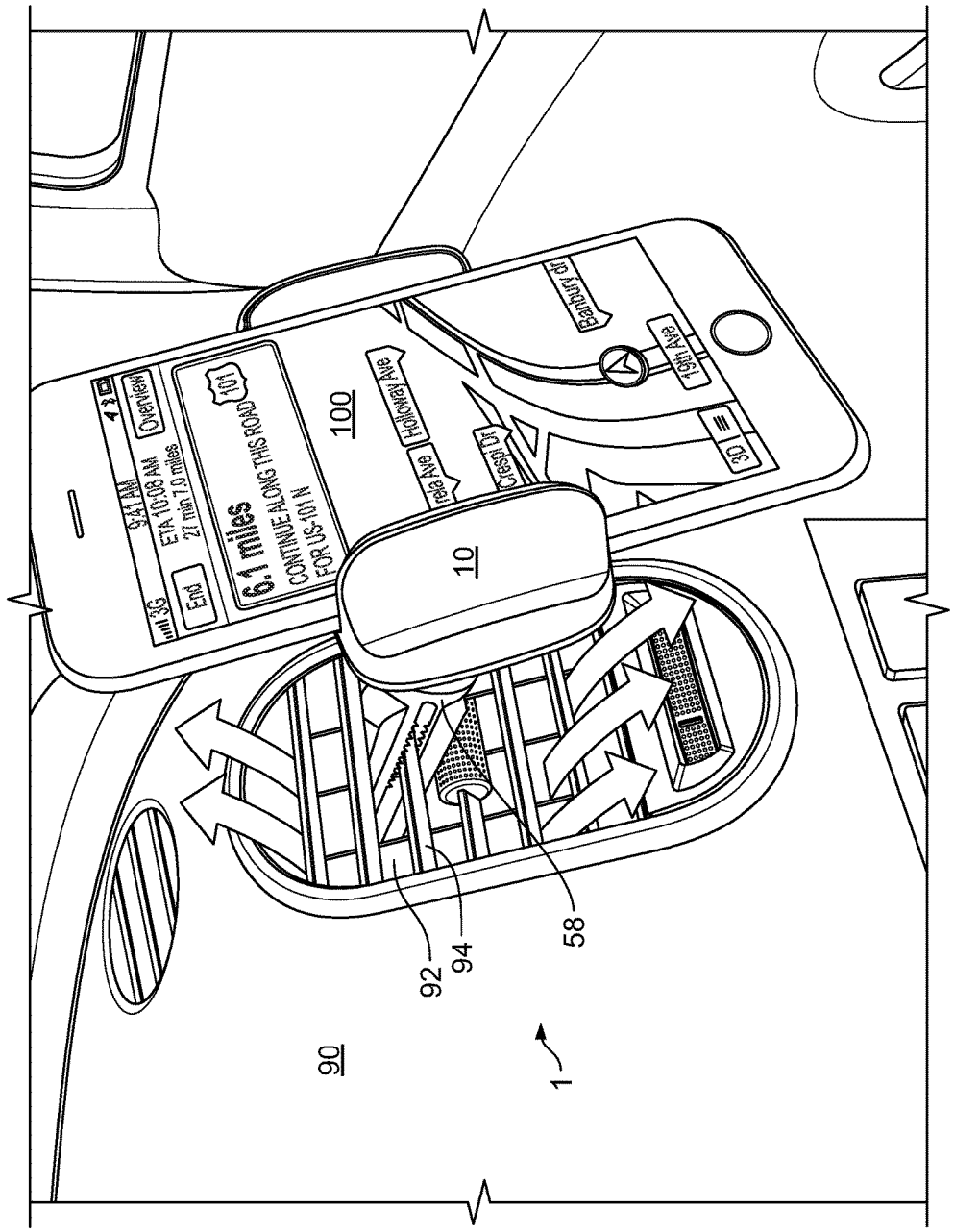
FIG. 6 illustrates a view of the first embodiment in use within a vehicle.

Referring to FIG. 6, a view of the first embodiment in use within a vehicle is shown.

The automotive phone holder with integrated air freshener 1 is shown holding a mobile phone 100 within the head 10.

The automotive dashboard 90 includes a vent 92 with multiple louvers 94. The louver interface arms 58 slide over a louver 94, holding the automotive phone holder with integrated air freshener 1 in place.

Figure 7:
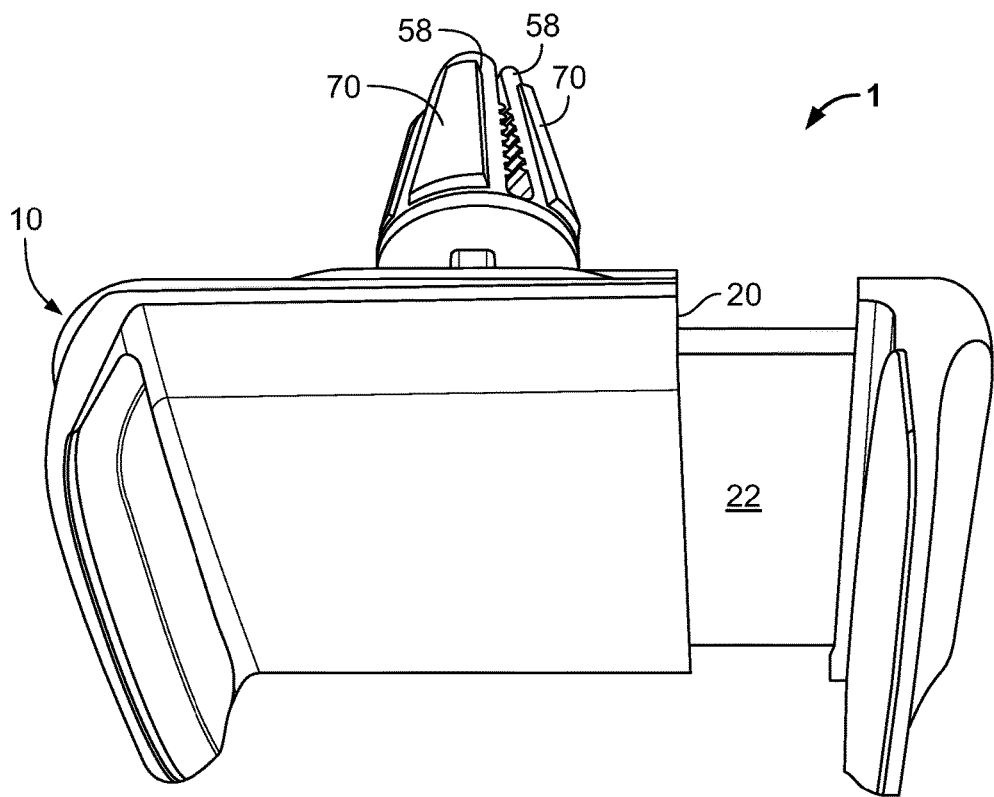
FIG. 7 illustrates a front view of the first embodiment with the clamping head in an expanded position.

Referring to FIG. 7, a front view of the first embodiment with the clamping head in an expanded position is shown.

The head 10 is shown separating at the sliding connection 20, exposing the telescoping inner body 22. The telescoping inner body 22 is preferably biased toward a closed position by a hidden internal spring.

This action acts to grip a mobile phone 100 (FIG. 6).

Figure 8:
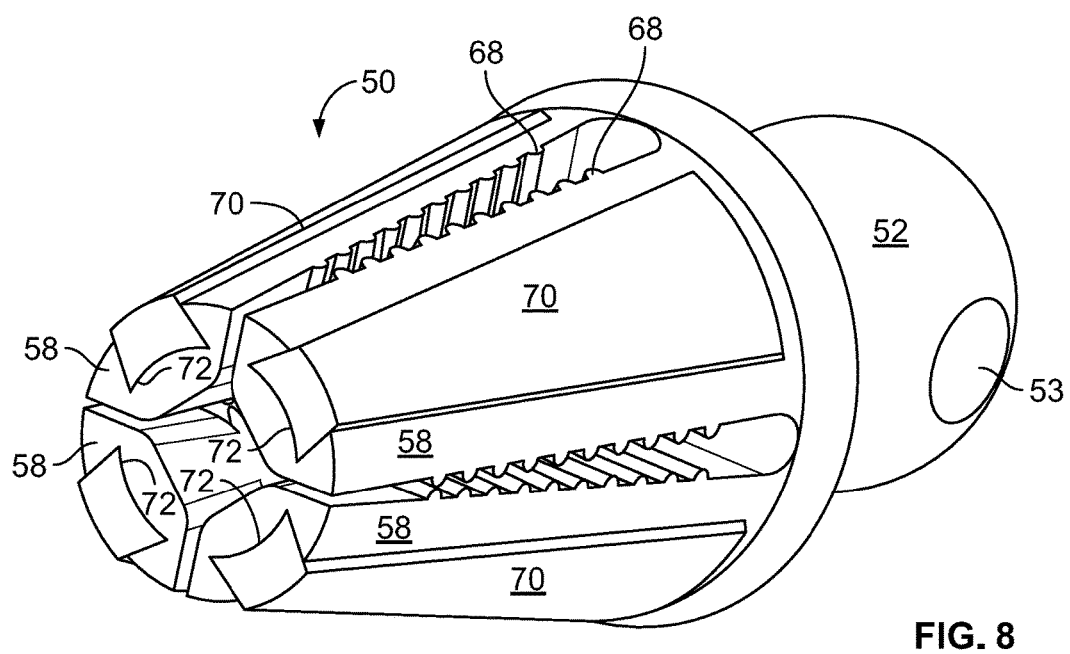
FIG. 8 illustrates a side view of the first embodiment.

Referring to FIG. 8, a side view of the first embodiment is shown.

A cut-away of the louver interface arms 58 of the mounting mechanism 50 is shown. Shown are optional serrations 68 that help the louver interface arms 58 to grip.

Passage 53 is an optional penetration through ball 52.

Each air freshener strip 70 is shown fitting within its associated louver interface arm 58 using a snap-type fit. The air freshener slot 72 is upwardly-tapered, or wider near the center of the mounting mechanism 50 than the surface. The air freshener strip 70 is correspondingly tapered, thus holding the air freshener strip 70 within the air freshener slot 72 without the use of adhesive.

In alternative embodiments, the air freshener strips 70 are glued in place, or otherwise permanently or semi-permanently affixed within the louver interface arms 50.

Figure 9:
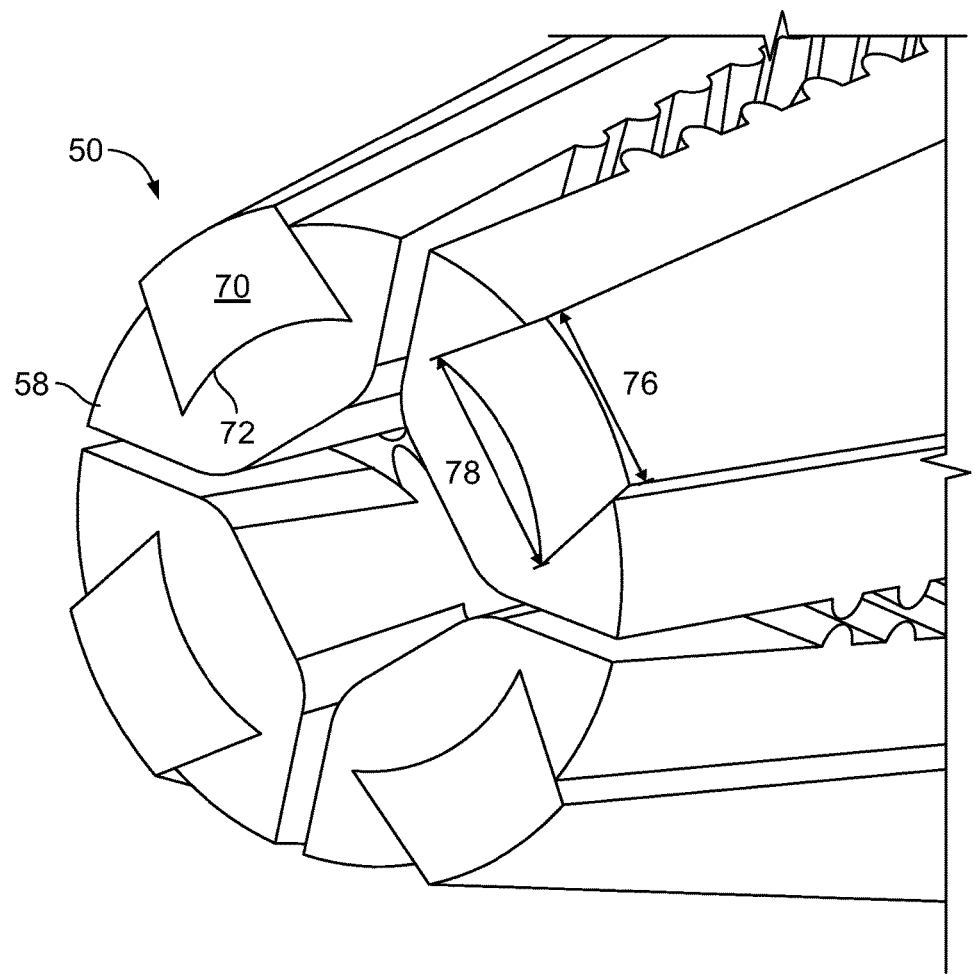
FIG. 9 illustrates a side view of the first embodiment.

Referring to FIG. 9, a side view of the first embodiment is shown.

The cut-away of the ends of the louver interface arms 58 is again shown.

As discussed above, the upper widths 76 of the air freshener strip 70 and air freshener slot 72 is less than the corresponding lower widths 78. The result is a snap-in, snap-out action.

The snapping is made possible by elastic deformation of the louver interface arm 58 and/or air freshener strip 70.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A combination cell phone holder and vehicle air freshener device for use with vent louvers inside an automobile, the device comprising:
    a clamp for gripping a cell phone;
    a vent attachment mechanism adapted to affix to the vent louvers;
    the vent attachment mechanism affixed to the clamp;
    one or more air-freshener strips integral to the vent attachment mechanism, whereby air leaving the vent louvers passes over the one or more air freshener strips;
    the louver interface arms including air freshener slots;
    the air freshener strips snapping into the air freshener slots.

2. The device of claim 1, further comprising an adjustment mechanism;
    the adjustment mechanism located between the vent attachment mechanism and the clamp;
    the adjustment mechanism permitting the clamp to be moved with respect to the attachment mechanism, thereby permitting varying positions of the cell phone.

3. The device of claim 2, wherein the adjustment mechanism is formed from two or more gripping arms that surround a ball:
    a compression nut threaded onto the gripping arms;
    whereby the compression nut acts to tighten or loosen the pressure of the gripping arms against the ball.

4. The device of claim 1, wherein the vent attachment mechanism includes two or more louver interface arms.

5. The device of claim 4, wherein the two or more louver interface arms include serrations to help grip the vent louvers.

6. A device that permits use of both an air freshener and holder for a mobile phone in a single automotive air vent, the device comprising:
    a clamp that grips the mobile phone;

a mounting mechanism that connects the clamp to the single automotive air vent;

an air freshener that includes scented strips;

the air freshener being part of the mounting mechanism;

the mounting mechanism including four louver interface arms:

a first two pairs of the four louver interface arms separated by a standard gap;

a second two pairs of the four louver interface arms separated by an expanded gap;

the expanded gap greater than the standard gap;

whereby the standard gap is used to install the device on a first group of automotive air vents, and the expanded gap is used to install the device on a second group of automotive air vents;

whereby the single automotive air vent supports the clamp, and thus the mobile phone, and when air is discharged from the single automotive air vent, the air passes over the air freshener.

7. The device of claim 6, wherein the mounting mechanism is formed from:

a ball connected to a flange by a stem;

each of the louver interface arms includes an air freshener slot with an upper width and a lower width;

the upper width less than the lower width;

the scented strips shaped to snap into the air freshener slots.

8. A device that creates space for an in-car air freshener by integrating the air freshener into a phone holder for a mobile phone, the device comprising:

a mounting mechanism that includes:

a flange;

louver interface arms interfaced to the flange;

each louver interface arm including an air freshener slot;

a phone clamp;

the phone clamp expanding and contracting to grip the mobile phone;

the phone clamp linked to the mounting mechanism;

one or more air freshener strips;

each of the one or more air freshener strips snapping into the air fresher slot of each louver interface arm;

whereby the resulting device integrates a phone holder and air freshener strips, allowing a single air vent within an automobile to both support a mobile phone and distribute scent within an automobile.

* * * * *